Aug. 7, 1928.

F. F. DALE ET AL

WATER HEATING SYSTEM

Filed Aug. 13, 1925

1,680,014

Inventors
F. F. Dale &
By I. W. Grace
Langner Parry, Card & Langner
Attys.

Patented Aug. 7, 1928.

1,680,014

UNITED STATES PATENT OFFICE.

FERRIS FARRAR DALE AND IAN WALTER GRACE, OF MARTINBOROUGH, NEW ZEALAND.

WATER-HEATING SYSTEM.

Application filed August 13, 1925, Serial No. 50,098, and in New Zealand November 8, 1924.

This invention relates to hot water systems, and its object is to provide an improved system, wherein cold water is prevented from mixing with the already heated water, thereby ensuring that the complete contents of the hot water storage cylinder may be utilized without the temperature of said contents being reduced by the admission of cold water to said cylinder.

The improved system comprises a water supply tank, a hot water storage cylinder, and a heater, in communication with each other, the chief feature of the invention being the arrangement of the pipe which delivers hot water from the heater to the storage cylinder so that said pipe rises to a point above the water level in said supply tank and the radiation of heat in the bottom of the storage cylinder.

Other features of the invention are the drawing "off" of the hot water from the bottom of the storage cylinder, instead of from the top thereof, the delivery of water from the supply tank, to the heater direct, instead of to the storage cylinder, and the circulation of water from the storage cylinder through the supply tank and heater, and back to the storage cylinder.

The invention will be more particularly described in conjunction with the accompanying drawing, which illustrates diagrammatically several forms of apparatus, embodying the invention.

Figure 1:
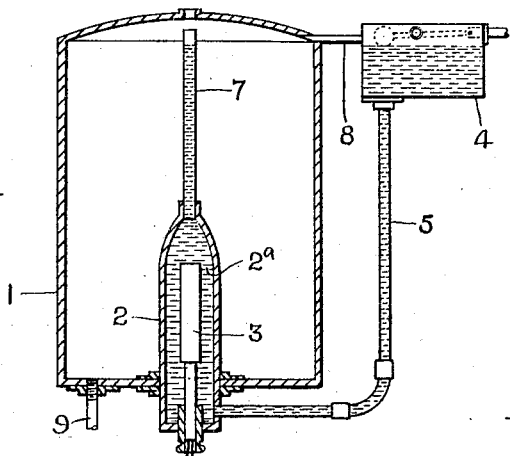
Figures 1 and 2 are vertical sections illustrating the improved system as provided with an electric heater.

Referring to Figure 1, the hot water storage cylinder 1, has the heater 2 fitted in the bottom thereof, said heater, comprising a hollow fitting 2ª, in which is installed an electrical heating element 3 preferably of the immersion heater type.

The water supply tank 4, which is provided with the usual ball cock for controlling the admission of water thereto, and also with the usual overflow, is placed conveniently in relation to the storage cylinder 1, water passing from the tank 4, via the pipe 5, into the lower portion of the interior of the heater 2, so as to come in contact with the heating element 3.

A pipe 7 extends upwards in the storage cylinder 1, from the top of the heater 2 to above the level of the water in the supply tank 4.

A pipe 8 connects the upper end of the cylinder 1, with the supply tank 4, said pipe 8 being located below the highest point of the pipe 7 and above the highest water level obtaining in the tank 4. This pipe 8 is open to atmosphere and serves as a vent.

With no water in the cylinder 1, and with water in the pipe 7, and tank 4 to the level indicated in the latter, and with the heater in operation the action is as follows:—

The water in the heater 2 is heated and expands or rises in the latter, and in the pipe 7, until it finally on reaching the boiling point passes over the upper end of the pipe 7 into the cylinder 1. This action continues until the cylinder 1 fills to the level of the pipe 8, and should no water be drawn off from the storage cylinder 1, through the pipe 9 which leads from the bottom of the cylinder 1, the water in the latter will ultimately overflow from the cylinder 1, via the vent pipe 8, to the tank 4, causing circulation to be set up through the latter, the pipe 5, heater 2 and pipe 7 back to the cylinder 1.

The whole of the contents of the cylinder 1 can be drawn off via the pipe 9, without the temperature of said contents being lowered by the admission of cold water to replace that drawn off, as water can only enter the cylinder 1, by being heated to a degree sufficient to cause it to pass over the upper end of the pipe 7, and there is not therefore, at any time any admission of cold water to the cylinder 1.

Further, the provision of the hollow fitting 2ª, containing the heating element 3, in the bottom of the cylinder 1, not only provides for the heating of water in said fitting 2ª, but the latter in turn, becomes heated, and radiates heat in the bottom of the cylinder, thereby further heating the water in the latter, adjacent the draw off point, or in the case of re-starting the apparatus, after the water in the cylinder 1 has been allowed to cool off, assisting to re-heat the water in the cylinder 1, although the quickest way to obtain hot water in the cylinder 1 is to run off the cold water via the pipe 9, and allow the cylinder 1 to re-fill with water from the pipe 7.

Figure 2:
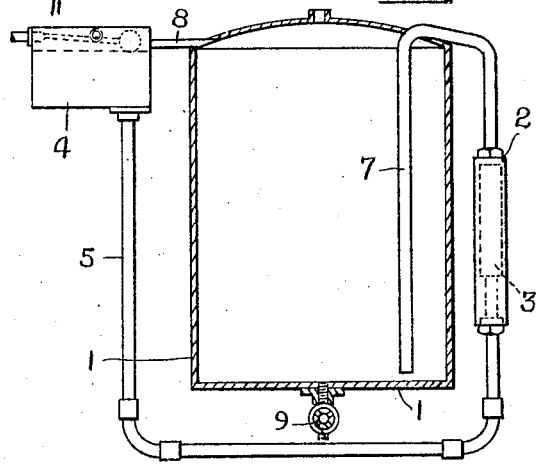

In the form shown in Figure 2, the electric heater 2 is located externally of the cylinder 1, the pipe 7 rising to a point above the level of water in the tank 4, and passing downwards in the said cylinder to near the bottom thereof.

In this case there is no radiation of heat in the cylinder 1, from the heater 2, such radiation being however, effected in the bottom of the cylinder 1, by the discharge thereinto near the bottom, from the pipe 7, of the hot water from the heater 2. Otherwise the operation of the system illustrated in Figure 2 is similar to that illustrated in Figure 1.

Figure 3:
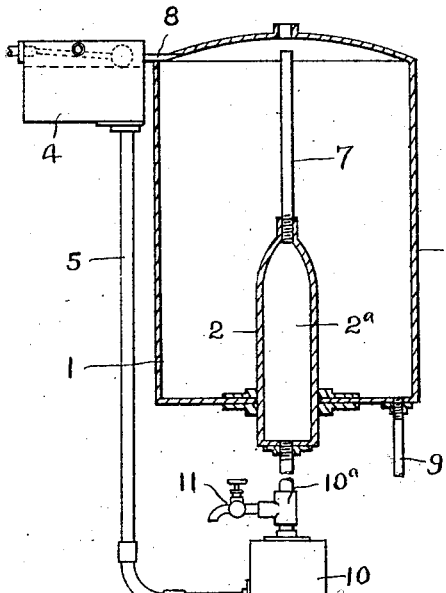
Figure 3 is a vertical section of a system with a boiler of a stove or furnace used for heating the water.

The form shown in Figure 3 corresponds with that shown in Figure 1, except that the electric heating element 3 is dispensed with, a boiler 10 adapted to be used in conjunction with any suitable form of stove or furnace, being used in place thereof, the water passing from the supply tank 4, via the pipe 5 to the boiler 10 where it is heated, from the latter via the pipe $10^a$, hollow fitting $2^a$, and pipe 7, to the cylinder 1, the hollow fitting $2^a$ being retained because of the increased heating surface it provides, to effect the radiation of heat in the bottom of the cylinder 1.

In the last described form, it is possible by providing a draw off cock 11 in the pipe $10^a$ as close as possible to the boiler 10 to obtain hot water from the latter, within a short time of starting the fire, in the furnace or stove in which the boiler 10 is fitted.

Figure 4:
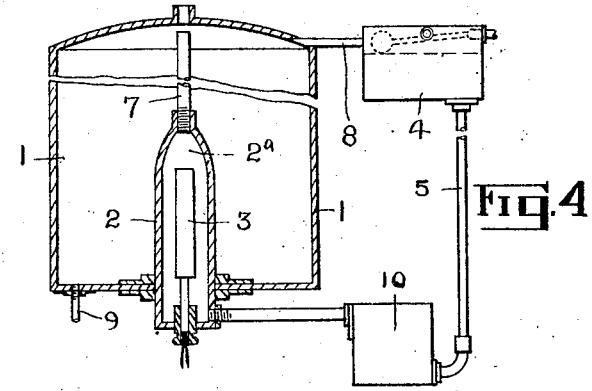
Figure 4 shows in vertical section, how an electric heater and a boiler may be used simultaneously in series, or each independtly of the other.

As shown in Figure 4, an elecric heater 2, and a boiler 10 may be included in the one system, and connected in series so that they may be used simultaneously or each independently of the other, as desired. In this form the pipe 10 passes water from the boiler 10 to the electric heater 2.

Also it is possible to utilize more than one boiler 10 in any one system in which case said boilers would be connected up in parallel.

Figure 5:
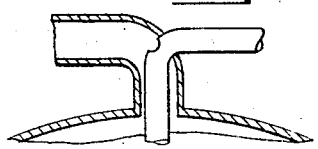
Figure 5 is a sectional fragment, parts being in elevation, illustrating a modification applicable to the form shown in Figure 2.

In the modification shown in Figure 5, and as applied to the form illustrated in Figure 2, the vent pipe 8 can be of greater diameter than the pipe 7, the latter passing downwards in the cylinder 1, to near the bottom thereof, through the vent pipe 8, and being provided with an opening $7^a$, which communicates with said vent pipe, 8.

Having thus described our invention, we declare that what we claim and desire to obtain by Letters Patent of the United States of America is:—

1. A water heating system comprising, a water supply tank having means for maintaining a constant level therein, a hot water storage cylinder, and a heater all in intercommunication, a hot water delivery pipe leading from the heater to the storage cylinder and rising to such point above the water level in the supply tank as will permit the column of water when heated by said heater to the predetermined degree for which said system is designed to overflow said delivery pipe into said storage tank and a circulation pipe affording communication between a hot water storage cylinder and the supply tank above the level of water in the latter, for enabling water to circulate from the storage cylinder through the supply tank and the heater and back to the storage cylinder when the latter is filled to the level of said circulating pipe.

2. A water heating system, comprising, a water supply tank having means for automatically maintaining a constant level therein, a water storage cylinder, and an electrically operated heater located in the bottom of the storage cylinder, all in intercommunication, a hot water delivery pipe leading from the heater to and rising within the storage cylinder to such a point above the water level in the supply tank as will permit the column of water when heated to the predetermined degree for which said system is designed to overflow said delivery pipe into said storage tank, the height of said delivery pipe being such as to have its upper end above the constant level maintained within the supply tank.

3. A water heating system, comprising, a water supply tank having means for automatically maintaining a constant level therein, a water storage cylinder, and an electrically operated heater located in the bottom of the storage cylinder, all in intercommunication, a hot water delivery pipe leading from the heater to and rising within the storage cylinder to such a point above the water level in the supply tank as will permit the column of water when heated to the predetermined degree for which said system is designed to overflow said delivery pipe into said storage tank, the height of said first-mentioned delivery pipe being such as to have its upper end above the constant level maintained within the supply tank, a second water delivery pipe leading from the supply tank directly to the heater and a hot water draw off pipe leading from the bottom of the storage cylinder.

4. A water heating system as set forth in claim 2, comprising, a combined vent and circulation pipe affording direct communication between the storage cylinder and the supply tank and located between the highest point of the hot water delivery pipe and the water level in the supply tank, for enabling water to circulate from the storage cylinder through the supply tank and the heater and back to the storage cylinder when the latter is filled to the level of said circulation pipe.

5. A water heating system according to claim 3, comprising a combined vent and circulation pipe affording a communication between the storage cylinder and the supply tank and located between the highest point of the first mentioned hot water delivery pipe and the water level in the supply tank, for enabling water to circulate from the storage cylinder through the supply tank and the heater and back to the storage cylinder when the latter is filled to the level of said circulation pipe.

In testimony whereof we have signed our names to this specification.

FERRIS FARRAR DALE.
IAN WALTER GRACE.